(12) United States Patent
Miki et al.

(10) Patent No.: US 8,747,985 B2
(45) Date of Patent: Jun. 10, 2014

(54) OPTICAL RECORDING MEDIUM

(75) Inventors: Takeshi Miki, Tokyo (JP); Yuki Tauchi, Hyogo (JP)

(73) Assignees: Sony Corporation, Tokyo (JP); Kabushiki Kaisha Kobe Seiko Sho, Hyogo (JP)

( * ) Notice: Subject to any disclaimer, the term of this patent is extended or adjusted under 35 U.S.C. 154(b) by 0 days.

(21) Appl. No.: 13/820,713

(22) PCT Filed: Sep. 9, 2011

(86) PCT No.: PCT/JP2011/005104
§ 371 (c)(1),
(2), (4) Date: Mar. 4, 2013

(87) PCT Pub. No.: WO2012/035740
PCT Pub. Date: Mar. 22, 2012

(65) Prior Publication Data
US 2013/0164544 A1    Jun. 27, 2013

(30) Foreign Application Priority Data
Sep. 16, 2010    (JP) ................................. 2010-208148

(51) Int. Cl.
*G11B 7/24*    (2013.01)

(52) U.S. Cl.
USPC ..................... 428/64.1; 428/64.4; 430/270.12

(58) Field of Classification Search
USPC ..................... 428/64.4; 430/270.12
See application file for complete search history.

(56) References Cited

U.S. PATENT DOCUMENTS

| 7,601,481 | B2 | 10/2009 | Shinkai |
| 8,361,586 | B2* | 1/2013 | Miki et al. ................... 428/64.1 |
| 2011/0044157 | A1 | 2/2011 | Miki et al. |
| 2011/0064903 | A1* | 3/2011 | Miki ........................... 428/64.4 |
| 2011/0069602 | A1* | 3/2011 | Miki ........................... 369/283 |
| 2011/0216643 | A1 | 9/2011 | Tauchi et al. |
| 2011/0300324 | A1* | 12/2011 | Miki ........................... 428/64.4 |
| 2012/0176883 | A1 | 7/2012 | Tauchi et al. |
| 2012/0177863 | A1 | 7/2012 | Tauchi et al. |
| 2012/0181172 | A1 | 7/2012 | Matsuzaki et al. |

FOREIGN PATENT DOCUMENTS

| CN | 101449184 A | 6/2009 |
| JP | 2008-112556 | 5/2008 |
| JP | 2008-273167 A | 11/2008 |
| JP | 2010-137545 A | 6/2010 |
| TW | 201007725 A1 | 2/2010 |
| WO | 2007123230 A1 | 11/2007 |
| WO | 2008059582 A1 | 5/2008 |
| WO | 2009096174 A1 | 8/2009 |

OTHER PUBLICATIONS

U.S. Appl. No. 13/640,812, filed Apr. 6, 2011.
Taiwanese Office Action dated Nov. 19, 2013, issued in connection with counterpart Taiwanese Application No. 100132637.

* cited by examiner

*Primary Examiner* — Elizabeth Mulvaney
(74) *Attorney, Agent, or Firm* — Dentons US LLP

(57) ABSTRACT

An optical recording medium including a substrate and two or more recording layers that contain Pd, O, and M (M comprises at least one of Zn, Al, In, and Sn), where O is contained in an amount greater than a stoichiometric composition thereof when M is completely oxidized (into $ZnO$, $Al_2O_3$, $In_2O_3$, and $SnO_2$). An nth recording layer of the two or more recording layers, as counted from an opposite side of an incident side of recording light, has a Pd content that is less than that of an (n−1)th recording layer.

5 Claims, 4 Drawing Sheets

OPTICAL RECORDING MEDIUM

TECHNICAL FIELD

The present invention relates to an optical recording medium such as an optical disc, more particularly to an optical recording medium that has two or more layers of recording layers and is capable of recording with high recording density.

BACKGROUND ART

In recent years, a high-capacity optical disc called Blu-ray disc (BD, registered trademark) is commercialized.

This high-capacity optical disc attains about 25 GB recording capacity with about 405 nm of light wavelength for recording and reproduction and about 0.85 of a numerical aperture (NA) of a collective lens as an optical system for recording and reproduction.

In this high-capacity optical disc, in order to attain a recordable optical disc, various types of recordable recording layer materials are considered.

As a recording layer material for a recordable optical disc in related art, an organic dye material has been known.

However, if an organic dye material is used, there is a problem that sufficient productivity cannot be obtained and a problem of long-term stability and storage properties for a recording signal.

Further, there is also a problem that an appropriate organic dye that can be used for light for recording and reproduction with about 405 nm of wavelength is not found.

In this regard, it is considered to use an inorganic material as a recordable recording layer material.

For example, an optical recording medium having a recording layer that contains Te—O, which is crystallized rapidly with rising temperature and causes an optical change, or the like, is proposed (see Patent Document 1).

Patent Document 1: Japanese Patent Application Laid-open No. 2008-112556

DISCLOSURE OF THE INVENTION

Problem to be Solved by the Invention

Meanwhile, in the recordable optical recording medium of the high-capacity optical disc described above, in order to attain larger capacity, the recording layer thereof has two or more layers, i.e., the recording layer is multi-layered.

In the case where a recording layer is multi-layered as described above, it is important to appropriately set a reflectance and a transmittance of each recording layer.

Then, for example, by providing a dielectric layer adjacent to the recording layer and selecting the thickness of the dielectric layer, it is possible to control the reflectance.

However, if the reflectance and the transmittance of each recording layer are set with the layer having the same configuration, the recording properties of the recording layers may be different with each other. For that reason, some recording layers might not be able to attain good recording properties.

In order to solve the problems described above, in the present invention, an optical recording medium that is capable of controlling the reflectance and the transmittance of each recording layer and attaining good recording properties in each recording layer is provided.

Means for Solving the Problem

An optical recording medium according to the present invention includes a substrate and two or more layers of recording layers. Then, the two or more layers of recording layers contain Pd, O, and M (M is one or more elements of Zn, Al, In, and Sn) and O is contained in an amount greater than a stoichiometric composition thereof when M is completely oxidized (into ZnO, $Al_2O_3$, $In_2O_3$, and $SnO_2$).

Further, in the case where the recording layer is an nth (n is a natural number of two or more) recording layer of the two or more layers of recording layers as counted from an opposite side of an incident side of recording light, the Pd content therein is less than that in an n−1th recording layer.

According to the configuration of the optical recording medium of the present invention described above, the Pd content in the nth recording layer as counted from the opposite side of the incident side of recording light is less than that in the n−1th recording layer. As described above, a Pd content in the nth recording layer is less than that in the n−1th recording layer. This decreases light absorption, and thus the transmittance is increased. As a result, although recording sensitivity in a layer having a low Pd content is decreased, recording sensitivity in a recording layer on the opposite side of the incident side is increased.

Therefore, by setting the reflectance to be equal, it is possible to compensate the decrease in recording sensitivity in some recording layers (particularly, recording layer close to the opposite side of the incident side of light).

Further, by changing a Pd content in a recording layer, it is possible to change the transmittance of the recording layer.

Effect of the Invention

According to the present invention describe above, by changing the Pd content in each recording layer, it is possible to change the transmittance or the recording sensitivity in the recording layer.

Accordingly, it is possible to control the transmittance and recording sensitivity in each recording layer and attain good recording properties.

Therefore, according to the present invention, it is possible to attain an optical recording medium that is formed of multiple layers of recording layers having good recording properties.

BEST MODE(S) FOR CARRYING OUT THE INVENTION

Hereinafter, the best mode for carrying out the invention (hereinafter referred to as embodiment) will be described.

It should be noted that the description will be given in the following order.
1. First Embodiment
2. Second Embodiment
3. Third Embodiment
4. Experimental Example

1. First Embodiment

Figure 1:
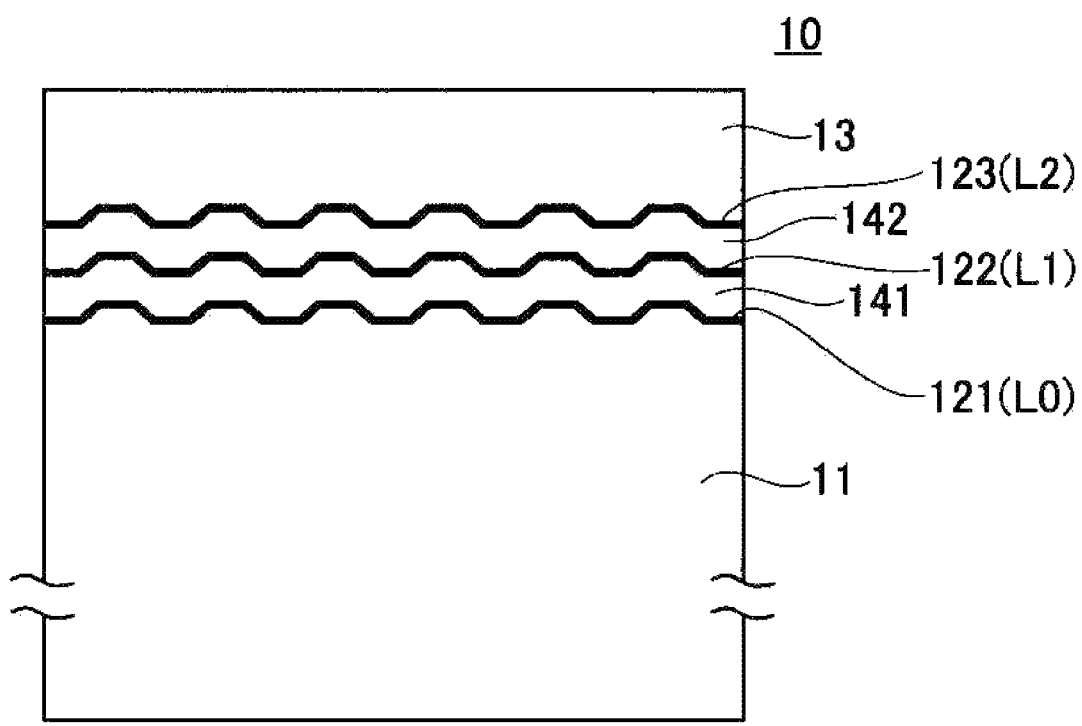
FIG. 1 A schematic configuration diagram (cross-sectional view) of an optical recording medium according to a first embodiment of the present invention.

FIG. 1 shows an schematic configuration diagram (cross-sectional view) of an optical recording medium according to a first embodiment of the present invention.

In this optical recording medium 10, on a substrate 11, three layers of recording layers 121 (L0), 122 (L1), and 123 (L2) are provided. It should be noted that for convenience, L0, L1, and L2 are added to be shown because, in a multi-layered recording medium, a recording layer closest to a substrate is referred to as L0, followed by L1, L2 . . . , normally.

Moreover, between the recording layers 121, 122, and 123, intermediate layers 141 and 142 that are formed of a light transmissive material are provided.

Furthermore, on the recording layer 123 being the uppermost layer, a protective layer 13 that is formed of a light transmissive material is provided.

In the case where the optical recording medium 10 according to this embodiment has the configuration of the high-capacity optical disc (BD, registered trademark) described above, the disc-shaped substrate 11 having a thickness of about 1.1 mm and an outer diameter of about 120 mm is used. Then, on a surface side thereof, e.g., on a surface on which a concavo-convex shape as wobbling grooves is formed, the recording layers 121, 122, and 123 are provided via the intermediate layers 141 and 142 that are formed of a light transmissive material. Further, on the recording layer 123, the protective layer 13 that is formed of a light transmissive material is provided, and the optical recording medium 10 is configured so as to have a thickness of 1.2 mm as a whole.

In the case where the optical recording medium 10 has the configuration of the high-capacity optical disc described above, the incident side of recording light is a side of the protective layer 13.

It should be noted that the present invention is not limited to the configuration of the high-capacity optical disc described above, and the shape and the dimension (size, thickness, and the like) of the optical recording medium, the thicknesses of the substrate and the protective layer, and the like can be selected as appropriate depending on the intended use.

As a material of the substrate 11, for example, polycarbonate resin can be used.

The substrate 11 can be formed by transferring, from the master, a concavo-convex shape of the wobbling grooves for tracking by, for example, injection molding.

It should be noted that in the optical recording medium according to the present invention, the groove shape is not essential, and the optical recording medium only has to have a configuration in which tracking can be performed and cross talk between recording tracks is controlled appropriately.

Moreover, the recording tracks can be on grooves or lands viewed from the incident side of light, and any recording method can be used.

The recording layers 121, 122, and 123 contain Pd, O, and M (M is one or more elements of Zn, Al, In, and Sn) and O is contained in an amount greater than a stoichiometric composition thereof when M is completely oxidized (into ZnO, $Al_2O_3$, $In_2O_3$, and $SnO_2$).

Specifically, in these recording layers 121, 122, and 123, not only stable oxides such as ZnO and $Al_2O_3$ but also PdO or $PdO_2$ is included.

Then, when being irradiated with light such as a laser with central wavelength of about 405 nm, PdO is decomposed to Pd and $O_2$, and $PdO_2$ is decomposed to PdO and $O_2$. Since $O_2$ is generated, a bulge is generated in the configuration. Accordingly, a recording mark with a different reflectance from the circumference is formed.

As a material of the intermediate layers 141 and 142, for example, light-curable resin or heat-curable resin such as UV (ultraviolet ray) curable resin can be used. In this case, after the material is applied by spin-coating or the like, it is heated or irradiated with light. Thus, the intermediate layer can be formed.

The intermediate layers 141 and 142 only have to have sufficient optical transparency not to affect the recording properties, and their thicknesses only have to be within a range in which interlayer cross talk can be suppressed to be equal to or lower than a predetermined value.

For the protective layer 13, a heat-curable or light-curable resin material can be used. After the material is applied by a spin-coating method or the like to be deposited, it is cured by being heated or irradiated with light such as ultraviolet rays. Thus, the protective layer 13 can be formed. Alternatively, the protective layer 13 can be formed by using a resin sheet of UV curable resin or the like and polycarbonate or the like, or a resin sheet of an adhesive layer and polycarbonate or the like.

It should be noted that although not shown, on a surface (laser irradiation surface) of the protective layer 13, hard coating for protection against mechanical impact, scratch, and the like, or for preventing the recording and reproduction quality of an information signal from being degraded due to the attachment of dust or a fingerprint and the like when being used by a user may be applied.

For this hard coating, a material in which fine powder of silica gel is mixed in order to improve the mechanical strength, or UV curable resin such as solvent type resin and non-solvent type resin can be used.

In order that the hard coating may have mechanical strength and water repellency and oil repellency, it is desirable that the thickness of the hard coating is from about 1 μm to several μm.

Figure 2:
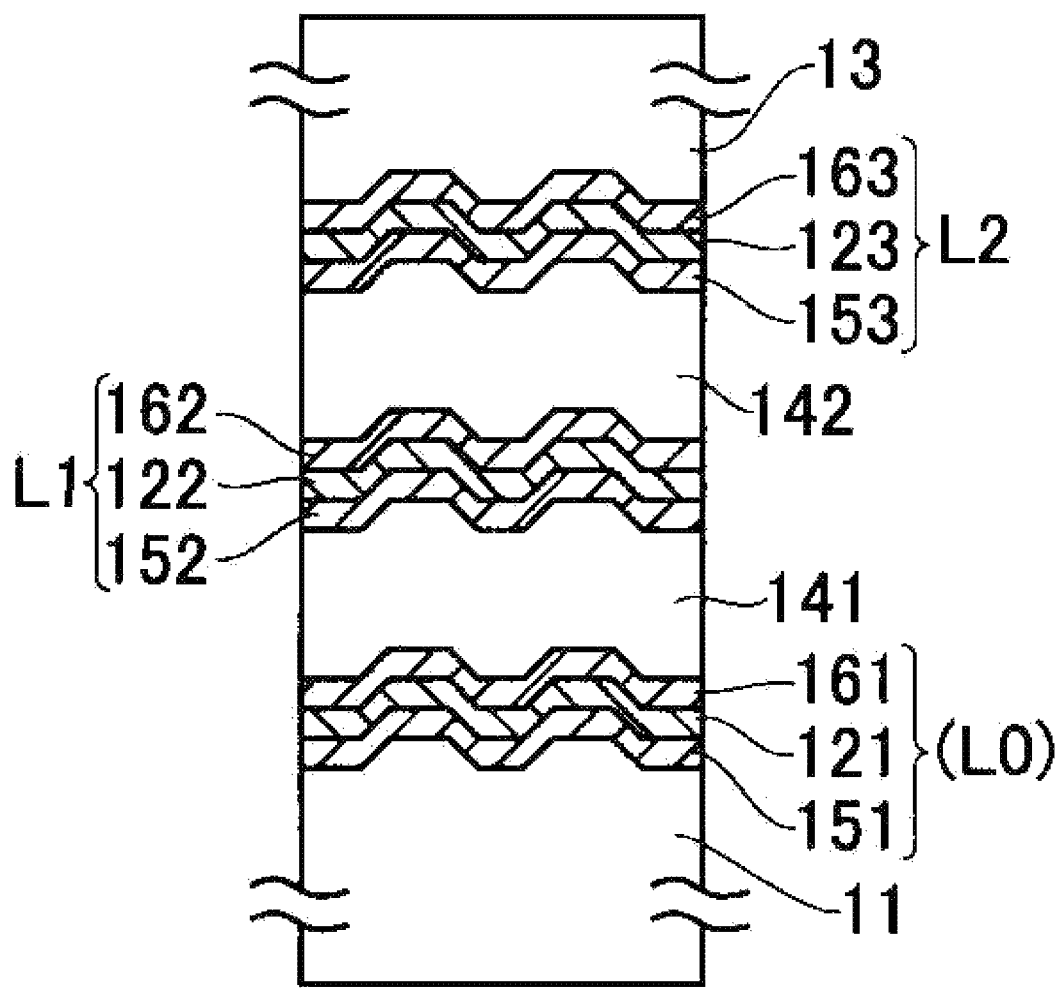
FIG. 2 An enlarged cross-sectional view of a main portion of the optical recording medium shown in FIG. 1.

Further, FIG. 2 shows an enlarged cross-sectional view of a main portion of the optical recording medium 10 shown in FIG. 1.

In this embodiment, on respective lower layers and upper layers of the recording layers 121, 122, and 123, light transmissive dielectric layers 151, 161, 152, 162, 153, and 163 that are formed of a material having a function as a protection film and have a thickness of about several nm to several tens nm are provided.

Examples of materials of the dielectric layers 151, 161, 152, 162, 153, and 163 include an oxide of In—O, Zn—O, Al—O, Sn—O, Ga—O, Si—O, Ti—O, V—O, Cr—O, Nb—O, Zr—O, Hf—O, Ta—O, or Bi—O. Further, nitrides such as SiN and AlN, and carbides such as SiC can be used. By using the material, durability of the recording layers 121, 122, and 123 can be increased.

The dielectric layers 151, 161, 152, 162, 153, and 163 can be deposited by a spattering process or the like with using the oxides, the nitrides, or the carbides described above as a target material.

Each material or thickness of the dielectric layers 151, 161, 152, 162, 153, and 163 is selected as appropriate depending on the needed properties. It should be noted that regarding each of the three layers of recording layers 121, 122, and 123, a material or thickness of the dielectric layer on the lower layer and upper layer thereof may be different from that of another recording layer.

It should be noted that in the case where a dielectric layer is provided as described above, by changing any one of a material, a composition, and a deposition condition of the dielectric layer, it is possible to change a transmittance of a recording layer including the dielectric layer. Examples of the deposition condition include deposition power (sputtering power in the case of a spattering process) during the deposition, and oxygen partial pressure being a deposition atmosphere. Here, the oxygen partial pressure indicates oxygen gas pressure in all the gasses including an Ar gas and the oxygen gas in the case where, for example, the Ar gas is used as an inert gas.

As an example in which the transmittance is changed by selecting the material, for example, In—Sn—O and In—Si—Zr—O are cited. In this case, In—Si—Zr—O has a higher transmittance than In—Sn—O. Moreover, as an example in which the transmittance is changed by changing the composition, In—Ga—Zn—O is cited. The transmittance is increased with the composition ratio of In:Ga:Zn=34:33:33 compared with the case of the composition ratio of In:Ga:Zn=88:6:6. Moreover, in the case where the transmittance is changed by, for example, the oxygen partial pressure as the deposition condition, the transmittance is increased in the case where the oxygen partial pressure is high compared with the case where the oxygen partial pressure is low. Further, in the case where the transmittance is changed by the power during the deposition, the transmittance is increased in the case where the power is high compared with the case where the power is low.

Moreover, particularly, the dielectric layers 151, 152, and 153 on the lower layers (side of the substrate 11) of the recording layers 121, 122, and 123 contribute to the margin of the recording power and the like mainly. Therefore, by using the material or the thickness of the dielectric layers 151, 152, and 153 on the lower layers, properties such as the margin of the recording power can be controlled.

Moreover, particularly, the dielectric layers 161, 162, and 163 on the upper layers (incident side of recording light, side of the protective layer 13) of the recording layers 121, 122, and 123 contribute to the reflectance of the recording layer mainly. Therefore, by using the material or the thickness of the dielectric layers 161, 162, and 163 on the upper layers, the reflectance of each recording layer can be controlled. For example, by using In—O for the material of the dielectric layers 161, 162, and 163 on the upper layers and changing film thicknesses of the dielectric layers 161, 162, and 163 on the upper layers, the reflectance of each recording layer can be changed. As the film thickness of the dielectric layer on the upper layer is large, the reflectance of the recording layer is decreased.

The reflectance of each of the recording layers 121, 122, and 123 viewed from the incident side of light is as follows.

L0 layer 121: reflectance of L0 layer×(transmittance of L1 layer)²×(transmittance of L2 layer)²

L1 layer 122: reflectance of L1 layer×(transmittance of L2 layer)²

L2 layer 123: reflectance of L2 layer

Therefore, if the reflectance and the transmittance of each layer are designed such that these reflectances are the same value, the reflectances of three layers of recording layers viewed from the incident side of light can be set to be equal.

In this embodiment, particularly, the Pd content in the recording layers 121, 122, and 123 becomes small from the side of the substrate 11 to the incident side of recording light. Specifically, the Pd content in the recording layer 122 of L1 is smaller than that in the recording layer 121 of L0, and the Pd content in the recording layer 123 of L2 is smaller than that in the recording layer 122 of L1.

By changing the Pd content as described above, the transmittance can be significantly changed. At this time, the reflectance is not significantly changed, and the absorption is significantly changed.

In other words, if the Pd content is increased, the transmittance is decreased, and the absorption is increased. If the Pd content is decreased, the transmittance is increased, and the absorption is decreased. In general, the recording sensitivity is related to the absorption, and as the absorption is high, the recording sensitivity is improved.

As described above, in the case where the film thickness of the dielectric layer on the upper layer of each recording layer is selected and the reflectances of the three layers of the recording layers of 121, 122, and 123 viewed from the incident side of light are set to be equal, if the three layers of recording layers have the same configuration (composition and film thickness), a difference in optimal recording power of each recording layer occurs. For example, if the film thicknesses of the dielectric layers 161, 162, and 163 on the upper layers of the recording layers are thickened from the side of the substrate 11 to the incident side of light and the equation 161<162<163 is satisfied, the reflectances of the three layers of recording layers 121, 122, and 123 viewed from the incident side of light can be set to be equal. At this time, the recording sensitivity of the recording layer 121 of L0 on the side of the substrate 11 is decreased.

On the other hand, if the Pd content in the recording layer 121 of L0 is increased, the absorption is increased and the recording sensitivity is improved. Moreover, if the transmittance of the recording layer 123 of L2 is increased, the recording sensitivity of the recording layers 123 is decreased. However, it is considered that the recording sensitivities of the recording layers 121 and 122 on the lower layer can be improved because more light enters the recording layers 121 and 122 on the lower layer.

Accordingly, it is possible to fill the difference in the optimal recording power of each of the recording layer 121, 122, and 123, and cause the optimal recording power of each of the recording layer 121, 122, and 123 to have a close value.

According to the configuration of the optical recording medium 10 of this embodiment described above, the Pd content in the recording layers 121, 122, and 123 becomes small from the side of the substrate 11 to the incident side of recording light.

Accordingly, since the Pd content becomes small from the side of the substrate 11 to the incident side of recording light, the light absorption is decreased and the transmittance is increased. Accordingly, the recording sensitivity in a layer with a small Pd content is decreased. However, the recording sensitivity of a recording layer on the opposite side of the incident side is increased.

Therefore, by setting the reflectance to be equal, the decrease in the recording sensitivities of some recording layers (particularly, the recording layer 121 of L0 close to the opposite side of the incident side of light) can be compensated.

Moreover, by changing the Pd content in the recording layer, the transmittance of the recording layer can be changed.

According to the configuration of the optical recording medium 10 of this embodiment, by changing the Pd content in each of the recording layers 121, 122, and 123, it is possible to change the transmittance and the recording sensitivity of each of the recording layers 121, 122, and 123, as described above. Accordingly, it is possible to control the transmittance and the recording sensitivity of each of the recording layers 121, 122, and 123, and attain good recording properties.

Therefore, it is possible to attain the optical recording medium 10 that has good recording properties and is formed of three layers of recording layers.

2. Second Embodiment

Figure 3:
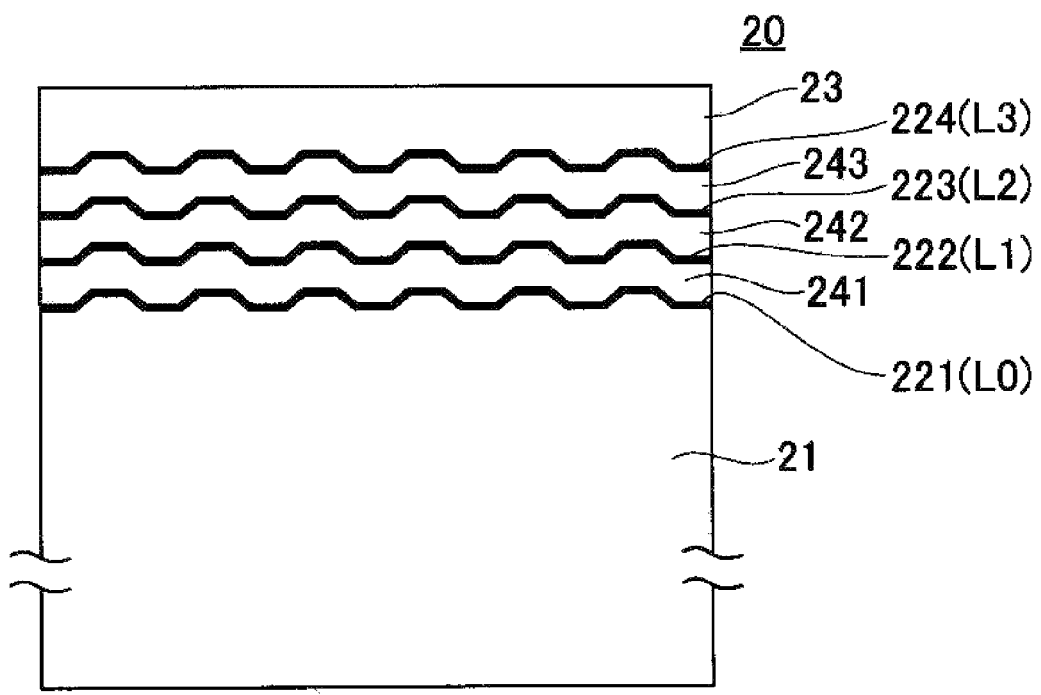
FIG. 3 A schematic configuration diagram (cross-sectional view) of an optical recording medium according to a second embodiment of the present invention.

FIG. 3 shows a schematic configuration diagram (cross-sectional view) of an optical recording medium according to a second embodiment of the present invention.

In this optical recording medium 20, on a substrate 21, three layers of recording layers 221 (L0), 222 (L1), 223 (L2), and 224 (L3) are provided.

Moreover, between the recording layers 221, 222, 223, and 224, intermediate layers 241, 242, and 243 that are formed of light a transmissive material are provided.

Furthermore, on the recording layer 224 being the uppermost layer, a protective layer 23 that is formed of light a transmissive material is provided.

In the case where the optical recording medium 20 according to this embodiment has the configuration of the high-capacity optical disc (BD, registered trademark) described above, the disc-shaped substrate 21 having a thickness of about 1.1 mm and an outer diameter of about 120 mm is used. Then, on a surface side thereof, e.g., on a surface on which a concavo-convex shape as wobbling grooves is formed, the recording layers 221, 222, 223, and 224 are provided via the intermediate layers 241, 242, and 243 that are formed of a light transmissive material. Further, on the recording layer 224, the protective layer 23 that is formed of a light transmissive material is provided. The optical recording medium 20 is configured so as to have a thickness of 1.2 mm as a whole.

In the case where the optical recording medium 10 has the configuration of the high-capacity optical disc described above, the incident side of recording light is a side of the protective layer 23.

The material or the forming method of each layer of the optical recording medium 20 can be the same as that of the optical recording medium 10 according to the first embodiment.

Specifically, as a material of the substrate 21, for example, polycarbonate resin can be used.

The recording layers 221, 222, 223, and 224 contain Pd, O, and M (M is one or more elements of Zn, Al, In, and Sn) and O is contained in an amount greater than a stoichiometric composition thereof when M is completely oxidized.

As a material of the intermediate layers 241, 242, and 243, for example, light-curable resin or heat-curable resin such as UV curable resin can be used.

For the protective layer 23, a heat-curable or light-curable resin material can be used.

Moreover, although not shown, on a surface of the protective layer 23, hard coating may be applied. For this hard coating, a material in which fine powder of silica gel is mixed in order to improve the mechanical strength, or UV curable resin such as solvent type resin and non-solvent type resin can be used.

Moreover, although not shown, similarly as in the case of FIG. 2 of the first embodiment, on respective lower layers and upper layers of the recording layers 221, 222, 223, and 224, dielectric layers can be provided.

Examples of materials of the dielectric layers include an oxide of In—O, Zn—O, Al—O, Sn—O, Ga—O, Si—O, Ti—O, V—O, Cr—O, Nb—O, Zr—O, Hf—O, Ta—O, or Bi—O. Further, nitrides such as SiN and AlN, and carbides such as SiC can be used.

Then, by using the material or the thickness of the dielectric layers on the lower layers of the recording layers 221, 222, 223, and 224, properties such as the margin of the recording power can be controlled.

Moreover, by using the material or the thickness of the dielectric layers on the upper layers of the recording layers 221, 222, 223, and 224, the reflectance of each recording layer can be controlled. For example, by using In—O for a material of the dielectric layers on the upper layers and changing film thicknesses of the dielectric layers on the upper layers, the reflectance of each recording layer can be changed. As the film thickness of the dielectric layer on the upper layer is large, the reflectance of the recording layer is decreased.

In this embodiment, particularly, the Pd content in the recording layers 221, 222, 223, and 224 becomes small from the side of the substrate 21 to the incident side of recording light.

Specifically, the Pd content in the recording layer 222 is smaller than that in the recording layer 221, the Pd content in the recording layer 223 is smaller than that in the recording layer 222, and the Pd content in the recording layer 224 is smaller than that in the recording layer 223.

By changing the Pd content as described above, the transmittance can be significantly changed similarly as the case of the optical recording medium 10 according to the first embodiment, the reflectance is not significantly changed, and the absorption is significantly changed.

As described above, in the case where the film thickness of the dielectric layer on the upper layer of each recording layer is selected and the reflectances of the four layers of the recording layers of 221, 222, 223, and 224 viewed from the incident side of light are set to be equal, if the four layers of recording layers have the same configuration (composition and film thickness), a difference in optimal recording power of each recording layer occurs. For example, if the film thicknesses of the dielectric layers on the upper layers of the recording layers are thickened from the side of the substrate 21 to the incident side of light, the reflectances of the four layers of recording layers 221, 222, 223, and 224 viewed from the incident side of light can be set to be equal. At this time, the recording sensitivity of the recording layer 221 of L0 on the side of the substrate 21 is decreased.

On the other hand, if the Pd content in the recording layer 221 of L0 is increased, the absorption is increased and the recording sensitivity is improved. Moreover, if the transmittance of the recording layer 224 of L3 is increased, the recording sensitivity of the recording layers 224 is decreased. However, it is considered that the recording sensitivities of the recording layers 221, 222, and 223 on the lower layer can be improved because more light enters the recording layers 221, 222, and 223 on the lower layer.

Accordingly, it is possible to fill the difference in the optimal recording power of each of the recording layer 221, 222, 223, and 224, and cause the optimal recording power of each of the recording layer 221, 222, 223, and 224 to have a close value.

According to the configuration of the optical recording medium 20 of this embodiment described above, the Pd content in the recording layers 221, 222, 223, and 224 becomes small from the side of the substrate 21 to the incident side of recording light.

Accordingly, since the Pd content becomes small from the side of the substrate 21 to the incident side of recording light, the light absorption is decreased and the transmittance is increased. Accordingly, the recording sensitivity in a layer with a small Pd content is decreased. However, the recording sensitivity of a recording layer on the opposite side of the incident side is increased.

Therefore, by setting the reflectance to be equal, the decrease in the recording sensitivity of some recording layers (particularly, the recording layer 221 of L0 close to the opposite side of the incident side of light) can be compensated.

Moreover, by changing the Pd content in the recording layer, the transmittance of the recording layer can be changed.

According to the configuration of the optical recording medium 20 of this embodiment, by changing the Pd content in each of the recording layers 221, 222, 223, and 224, it is possible to change the transmittance and the recording sensitivity of each of the recording layers 221, 222, 223, and 224, as described above. Accordingly, it is possible to control the transmittance and the recording sensitivity of each of the recording layers 221, 222, 223, and 224, and attain good recording properties.

Therefore, it is possible to attain the optical recording medium 20 that has good recording properties and is formed of four layers of recording layers.

3. Third Embodiment

Figure 4:
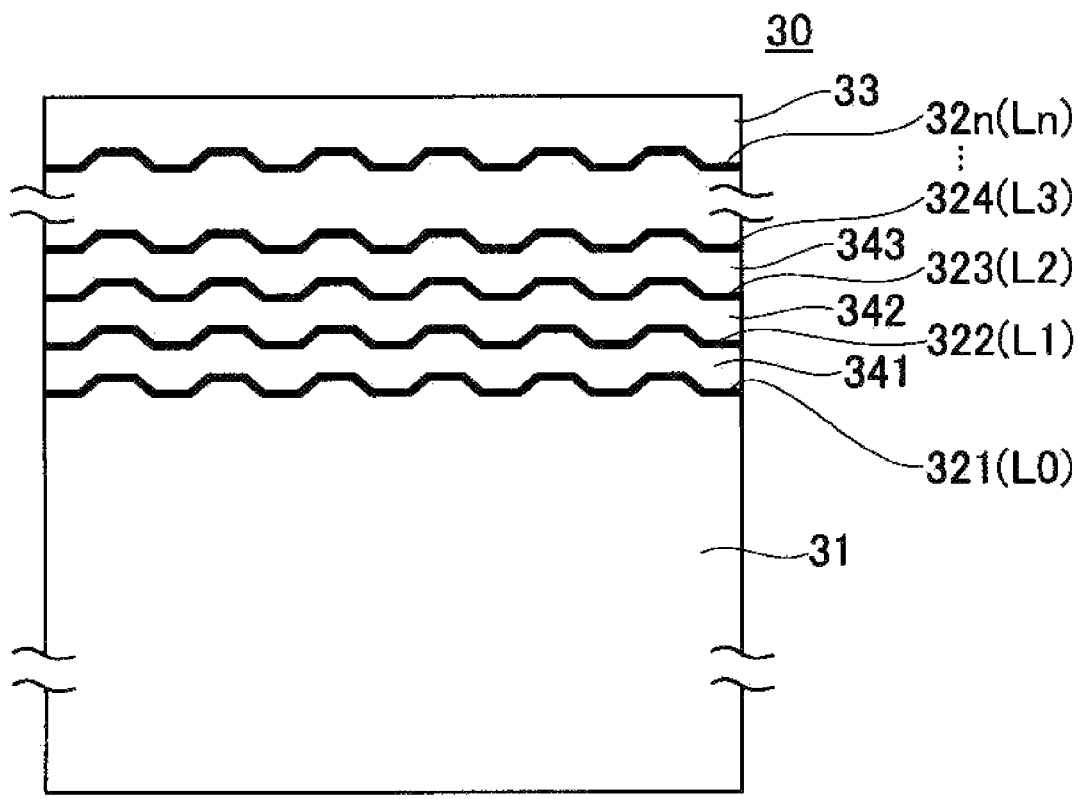
FIG. 4 A schematic configuration diagram (cross-sectional view) of an optical recording medium according to a third embodiment of the present invention.

FIG. 4 shows a schematic configuration diagram (cross-sectional view) of an optical recording medium according to a third embodiment of the present invention.

The configuration of the optical recording medium 30 in the case where a recording layer thereof has n (n is an arbitrary natural number of five or more) layers is shown.

In the optical recording medium 30 according to this embodiment, on a substrate 31, a concavo-convex shape as wobbling grooves is formed, similarly as in the cases of the first embodiment and the second embodiment. Then, on this concavo-convex forming surface, recording layers 321 (L0), 322, (L1), 323 (L2), 324 (L3), . . . , 32$n$ (Ln) are provided via intermediate layers 341, 342, 343, . . . , 34$n$ from the substrate 31 side. On the recording layer 32$n$ (Ln) being the uppermost layer, a protective layer 33 is provided.

Also in this case, in the case where the optical recording medium 30 has the configuration of the high-capacity optical disc described above, the thickness and the outer diameter of the substrate 31 and the thickness of the protective layer 33 are the same as those of the first embodiment shown in FIG. 1.

In this embodiment, a material and the like of each layer constituting the optical recording medium 30 can be the same as those of the optical recording medium 10 according to the first embodiment and the optical recording medium 20 according to the second embodiment described above.

In this embodiment, particularly, the Pd content in the recording layers 321, 322, 323, 324, . . . , 32$n$ becomes large from the side of the substrate 31 to the incident side of recording light. Specifically, a Pd content in a kth (k is a natural number of two or more and n or less) recording layer as counted from the opposite side of the incident side of recording light is less than that in a k−1th recording layer.

By changing the Pd content as described above, the transmittance can be significantly changed, the reflectance is not significantly changed, and the absorption is significantly changed, similarly as the optical recording medium 10 according to the first embodiment.

As described above, in the case where the film thickness of the dielectric layer on the upper layer of each recording layer is selected and the reflectances of the n layers of the recording layers (321 to 32$n$) viewed from the incident side of light are set to be equal, if the n layers of recording layers have the same configuration (composition and film thickness), a difference in optimal recording power of each recording layer occurs.

For example, if the film thickness of the dielectric layer provided on the upper layer of a kth (k is a natural number of two or more) recording layer is thickened more than that of the dielectric layer provided on the upper layer of a k−1th recording layer, and thus the film thicknesses of the dielectric layers on the upper layer of the recording layers are thickened from the side of the substrate 31 to the incident side of light. With such a configuration, the reflectances of the n layers of recording layers (321 to 32$n$) viewed from the incident side of light can be set to be equal. At this time, the recording sensitivity of a recording layer close to the side of the substrate 31 (recording layer 321 of L0 or the like) is decreased.

On the other hand, if the Pd content in the recording layer close to the side of the substrate 31 is increased, the absorption is increased and the recording sensitivity is improved. Moreover, if the transmittance of a recording layer on the incident side of light (recording layer 32$n$ of Ln or the like) is increased, the recording sensitivity of the recording layer is decreased. However, it is considered that the recording sensitivities of the recording layers on the lower layer can be improved because more light enters the recording layers on the lower layer.

Accordingly it is possible to fill the difference in the optimal recording power of each of the recording layer (321 to 32$n$), and make the optimal recording power of each of the recording layer (321 to 32$n$) a close value.

According to the configuration of the optical recording medium 30 of this embodiment described above, the Pd content in the recording layers 321 to 32$n$ becomes small from the side of the substrate 31 to the incident side of recording light. Specifically, the Pd content in a kth (k is a natural number of two or more and n or less) recording layer as counted from the side of the substrate 31 on the opposite side of the incident side of recording light is less than that in a k−1th recording layer.

Accordingly, since the Pd content becomes small from the side of the substrate 31 to the incident side of recording light, the light absorption is decreased and the transmittance is increased. Accordingly, the recording sensitivity in a layer with a small Pd content is decreased. However, the recording sensitivity of a recording layer on the opposite side of the incident side is increased.

Therefore, by setting the reflectance to be equal, the decrease in the recording sensitivity of some recording layers (particularly, the recording layer 321 of L0 close to the opposite side of the incident side of light, or the like) can be compensated.

Moreover, by changing the Pd content in the recording layer, the transmittance of the recording layer can be changed.

According to the configuration of the optical recording medium 30 of this embodiment, by changing the Pd content in each of the recording layers 321 to 32$n$, it is possible to change the transmittance and the recording sensitivity of each of the recording layers 321 to 32$n$, as described above. Accordingly, it is possible to control the transmittance and the recording sensitivity of each of the recording layers 321 to 32$n$, and attain good recording properties.

Therefore, it is possible to attain the optical recording medium 30 that has good recording properties and is formed of n layers of recording layers.

In the embodiments described above, the cases where the recording layers have three layers (n=3), four layers (n=4), and n layers (n≥5) are shown. However, the present invention can be applied to the case where the recording layer has two layers (n=2).

Moreover, in the embodiments described above, similarly as the configuration of the high-capacity optical disc described above, recording light is incident from the opposite side of the substrate. The present invention includes the configuration in which recording light is incident from the side of the substrate. In this configuration, recording light sufficiently transmits through the substrate, and the Pd content in a recording layer on the side of the substrate is small, contrary to the embodiments described above.

Moreover, the dielectric layer on the lower layer or upper layer of the recording layer is desired to be provided on the lower layer or upper layer of the recording layer. However, in the present invention, it is possible to provide the dielectric layer on one of the lower layer of the recording layer and the upper layer of the recording layer. Alternatively, it is possible not to provide the dielectric layer on the recording layer.

Moreover, in the embodiments described above, all the recording layers are recording layers containing Pd, O, and M.

The present invention includes an optical recording medium that further includes a recording layer having another configuration.

For example, a recording layer formed of another material including no Pd, or a recording layer dedicated to reproduction, which has a concavo-convex shape and is formed of a reflection film, may be provided additionally. The place where the recording layer having another configuration is provided is not limited. However, if it is provided on the side of the substrate closer than a plurality of recording layers containing Pd, the transmittance or the reflectance of each recording layer of the optical recording medium can be easily designed.

4. Experimental Example

Here, the optical recording medium 10 according to the first embodiment and an optical recording medium having a different configuration of a recording layer as a comparative example were made actually, and the transmittance, the reflectance, and the recording power sensitivity of the recording layer were measured.

Comparative Example

As a comparative example, an optical recording medium in which the configuration of a recording layer is different from that of the optical recording medium 10 according to the first embodiment and the recording layers 121, 122, and 123 have the same configuration was made.

As the substrate 11, disc-shaped polycarbonate resin having an outer diameter of 120 mm and a thickness of 1.1 mm was used.

The three layers of recording layers 121, 122, and 123 were formed of Zn—In—O—Pd film (Zn:In=5:5, (Zn+In):Pd=8:2) having a film thickness of 40 nm.

Moreover, the dielectric layers 151, 152, and 153 on the lower layers of the recording layers were formed of $In_2O_3$ film having a film thickness of 10 nm.

Moreover, the dielectric layers 161, 162, and 163 on the upper layers of the recording layers were formed of an $In_2O_3$ film so as to have a different film thickness of x (nm). Specifically, the film thickness of the dielectric layer 161 on the upper layer of the recording layer 121 of L0 was 5 nm, the film thickness of the dielectric layer 162 on the upper layer of the recording layer 122 of L1 was 20 nm, and the film thickness of the dielectric layer 163 on the upper layer of the recording layer 123 of L2 was 35 nm.

As the intermediate layers 141 and 142, acrylic UV curable resin was used.

On the recording layer 123 being the uppermost layer, the protective layer 13 formed of acrylic UV curable resin was provided.

Each recording layer and the dielectric layers on the upper and lower layer thereof were formed by a spattering process. Moreover, the intermediate layers and the protective layer were formed by a spin-coating method.

Other components were the same as those of the optical recording medium 10 according to the first embodiment, and thus the optical recording medium as a comparative example was made.

Next, the transmittance and the reflectance of each of the recording layers 121, 122, and 123 of the optical recording medium as a comparative example were measured.

The transmittance of each of the recording layers 121, 122, and 123 was about 55% and constant regardless of the thicknesses of the dielectric layers 161, 162, and 163 on the upper layers.

Moreover, the reflectance of the recording layer 121 of L0 was 10%, the reflectance of the recording layer 122 of L1 was 5.5%, and the reflectance of the recording layer 123 of L2 was 3%. The total reflectances of the recording layers 121, 122, and 123 viewed from the incident side of light can be set to be equal to be about 3%.

Next, the recording power sensitivity of each of the recording layers in the optical recording medium as a comparative example was measured. Then, a significant difference occurred as follows.

Recording layer 121 of L0: optimal recording power 20.1 mW
Recording layer 122 of L1: optimal recording power 10.9 mW
Recording layer 123 of L2: optimal recording power 6.0 mW As described above, although a well-balanced reflectance in each recording layer was able to be obtained, the balance of the recording power sensitivity was deteriorated.

Example

As an example, the optical recording medium 10 according to the first embodiment shown in FIG. 1 and FIG. 2 was made.

As the substrate 11, disc-shaped polycarbonate resin having a thickness of 1.1 mm was used.

The three layers of recording layers 121, 122, and 123 were formed of a Zn—In—O—Pd film having a film thickness of 40 nm, and the composition, particularly, Pd content of the three layers of recording layers 121, 122, and 123 was differentiated. Specifically, the composition was as follows.

Recording layer 121 of L0 Zn:In=5:5, (Zn+In):Pd=5:5
Recording layer 122 of L1 Zn:In=5:5, (Zn+In):Pd=8:2
Recording layer 123 of L2 Zn:In=5:5, (Zn+In):Pd=9:1

Moreover, the dielectric layers 151, 152, and 153 on the lower layers of the recording layers were formed of an $In_2O_3$ film having a film thickness of 10 nm.

Moreover, the dielectric layers 161, 162, and 163 on the upper layers of the recording layers were formed of an $In_2O_3$ film so as to have a different film thickness of x (nm). Specifically, the film thickness of the dielectric layer 161 on the upper layer of the recording layer 121 of L0 was 5 nm, the film thickness of the dielectric layer 162 on the upper layer of the recording layer 122 of L1 was 20 nm, and the film thickness of the dielectric layer 163 on the upper layer of the recording layer 123 of L2 was 35 nm.

As the intermediate layers 141 and 142, acrylic UV curable resin was used.

On the recording layer 123 being the uppermost layer, the protective layer 13 formed of acrylic UV curable resin was provided.

Each recording layer and the dielectric layers on the upper and lower layer thereof were formed by a spattering process. Moreover, the intermediate layers and the protective layer were formed by a spin-coating method.

Thus, the optical recording medium 10 was made. Next, the transmittance, the reflectance, and the optimal recording power of each of the recording layers 121, 122, and 123 in the optical recording medium 10 according to this example were measured. The measurement results were as follows.

Recording layer 121 of L0: transmittance of 32%, reflectance of 3%, optimal recording power of 10.9 mW Recording layer 122 of L1: transmittance of 55%, reflectance of 3%, optimal recording power of 8.0 mW Recording layer 123 of L2: transmittance of 75%, reflectance of 3%, optimal recording power of 9.0 mW As described above, the results of the well-balanced reflectances and recording sensitivities in the recording layers were able to be obtained.

Therefore, it was found that as the configuration of the optical recording medium according to the present invention, by controlling the Pd content in the multiple layers of recording layer in the optical recording medium, both of the reflectance and the recording sensitivity could be controlled and the balance of each recording layer could be optimized.

The optical recording medium according to the present invention can have a disc shape that is adopted as a typical optical recording medium. However, another shape such as a card shape can be adopted.

The present invention is not limited to the above-mentioned embodiments, and other various configurations can be adopted without departing from the gist of the present invention.

DESCRIPTION OF SYMBOLS

10, 20, 30 optical recording medium
11, 21, 31 substrate
121, 122, 123, 221, 222, 223, 224, 321, 322, 323, 324, 32$n$ recording layer
13, 23, 33 protective layer

141, 142, 241, 242, 243, 341, 342, 343 intermediate layer
151, 152, 153 dielectric layer (on lower layer)
161, 162, 163 dielectric layer (on upper layer)

The invention claimed is:

1. An optical recording medium, comprising:
   a substrate; and
   two or more recording layers stacked on one side of the substrate, each recording layer containing palladium (Pd), oxygen (O), and M M representing at least one of Zn, Al, In, and Sn,
   wherein,
   O is contained in an amount greater than a stoichiometric composition thereof when M is completely oxidized into at least one of ZnO, $Al_2O_3$, $In_2O_3$, and $SnO_2$, and
   a Pd content in an $n^{th}$ recording layer of the two or more recording layers as counted from a side of the optical recording medium opposite a recording light incident side is less than that in an (n−1)th recording layer, where n is a natural number equal or greater than two.

2. The optical recording medium according to claim 1, further comprising:
   a dielectric layer between each pair of successive recording layers, each dielectric layer comprising an oxide of at least one of indium (In), zinc (Zn), aluminum (Al), tin (Sn), gallium (Ga), silicon (Si), titanium (Ti), vanadium (V), chromium (Cr), niobium (Nb), zirconium (Zr), hafnium (Hf), tantalum (Ta), and bismuth (Bi), and a material comprising one of SiN, AN, and SiC.

3. The optical recording medium according to claim 1, further comprising:
   a respective dielectric layer provided on the recording light incident side of each recording layer
   wherein,
   the dielectric layer provided on the recording light incident side of the nth recording layer has a thickness larger than a dielectric layer provided the recording light incident side of the (n−1)th recording layer.

4. The optical recording medium according to claim 1, wherein the recording light is a incident side of the optical recording medium is a side on which the recording layer are stacked opposite to that of the substrate.

5. The optical recording medium according to claim 1, further comprising:
   an intermediate layer between each pair of successive recording layers, each intermediate layer comprising one of a light-curable resin and a heat-curable resin.

* * * * *